(12) United States Patent
Jo et al.

(10) Patent No.: US 11,898,878 B2
(45) Date of Patent: Feb. 13, 2024

(54) MULTI-SENSOR ASSEMBLY

(71) Applicant: HYOSUNG HEAVY INDUSTRIES CORPORATION, Seoul (KR)

(72) Inventors: Hyang Eun Jo, Tongyeong-si (KR); Young Min Kim, Gimhae-si (KR); Jae Ryong Jung, Gimhae-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 153 days.

(21) Appl. No.: 17/602,404

(22) PCT Filed: Apr. 17, 2020

(86) PCT No.: PCT/KR2020/005181
§ 371 (c)(1),
(2) Date: Oct. 8, 2021

(87) PCT Pub. No.: WO2020/218782
PCT Pub. Date: Oct. 29, 2020

(65) Prior Publication Data
US 2022/0205817 A1    Jun. 30, 2022

(30) Foreign Application Priority Data

Apr. 23, 2019  (KR) .......................... 10-2019-0047223

(51) Int. Cl.
*G01D 21/02*        (2006.01)
*G01D 11/24*        (2006.01)
*G01D 11/16*        (2006.01)

(52) U.S. Cl.
CPC ........... *G01D 11/245* (2013.01); *G01D 11/16* (2013.01); *G01D 21/02* (2013.01)

(58) Field of Classification Search
CPC ....... G01D 11/245; G01D 11/16; G01D 21/02
See application file for complete search history.

(56) References Cited

FOREIGN PATENT DOCUMENTS

| CN | 106525140 A | * | 3/2017 |
|----|-------------|---|--------|
| JP | 06-109520 A | | 4/1994 |
| JP | 2004-053548 A | | 2/2004 |
| KR | 20-0362372 Y1 | | 9/2004 |
| KR | 10-2014-0026380 A | | 3/2014 |
| KR | 10-1439485 B1 | | 9/2014 |

* cited by examiner

*Primary Examiner* — Jamel E Williams
(74) *Attorney, Agent, or Firm* — NKL LAW; Jae Youn Kim

(57) ABSTRACT

Proposed is a multi-sensor assembly, and the assembly of the present disclosure includes: a first sensor provided in a sensor coupling unit positioned at a front end of a housing; a second sensor provided in a mounting groove that is open toward a front surface of the first sensor; a first connector member configured to transmit a signal measured by the first sensor and, simultaneously, to firmly fix the first sensor to the sensor coupling unit; and a second connector member screw portion formed on an outer surface of a rear end of the first connector member so as to be coupled to a fixture screw portion of an adjustable fixture provided at a rear end of the housing, thereby moving relatively thereto.

12 Claims, 4 Drawing Sheets

MULTI-SENSOR ASSEMBLY

TECHNICAL FIELD

The present disclosure relates to a multi-sensor assembly and, more particularly, to a multi-sensor assembly capable of measuring various types of physical quantities.

BACKGROUND ART

In various fields of industry, it is necessary to measure a physical quantity required to control a specific device, and this is to control the operation of the device on the basis of the obtained physical quantity. In some cases, a large number of physical quantities are required to control one device, and for this purpose, it is necessary to use a sensor corresponding to each physical quantity.

However, when a corresponding number of sensors are used to obtain many kinds of physical quantities, there is a problem in that a large amount of space is required for the installation of the sensors. Therefore, there is a problem in that it is very difficult to separately install a plurality of sensors in a device in which only a narrow installation space is allowed.

According to such a situation, a need for a multi-sensor assembly having a plurality of sensors to measure a plurality of physical quantities in one sensor assembly is emerging.

In addition, in general, in a sensor assembly, it is often difficult to transmit the measured physical quantity to a controller that utilizes it. That is, it is necessary to prevent an environment of the space where the physical quantity is sensed by the sensor from affecting an environment of the space where the controller is installed. To this end, it is necessary to safely transmit the sensed physical quantity to the controller.

DISCLOSURE

Technical Problem

Accordingly, the present disclosure has been made keeping in mind the above problems occurring in the related art, and an objective of the present disclosure is to provide a multi-sensor assembly capable of simultaneously measuring various types of physical quantities.

Another objective of the present disclosure is to accurately and easily transmit a plurality of measured physical quantities to a controller.

Technical Solution

In order to accomplish the above objectives, the present disclosure may provide a multi-sensor assembly, the assembly including: a housing having an internal space formed therein; a first sensor coupled to a front end of the housing and configured to measure a physical quantity; a first connector member configured to transmit the physical quantity measured by the first sensor, having the first sensor coupled to a front end thereof, and installed in an inner space of the housing; at least one second sensor installed in the first sensor and having a second connection line extending to an outside of the housing through an inside of the first connector member; and a first connection line electrically connected to a rear end of the first connector member and extending to the outside through an opening portion formed at a rear end of the housing.

The housing may extend long in a longitudinal direction in a tubular shape.

The first sensor may be formed with a mounting groove to be open toward a front surface, the mounting groove being installed with the second sensor therein.

The first sensor may be formed with a through hole to communicate with the mounting groove thereof, the first sensor may be formed with a coupling hole to allow the through hole and the outside to communicate with each other, and the coupling hole may be coupled to the first connector member so that the inside of the first connector member and the through hole may be in communication with each other, whereby the second connection line configured to transmit a signal of the second sensor may pass therethrough.

The assembly may further include an adjustment fixture installed at the rear end of the housing and coupled to the first connector member to set an installation position of the first sensor.

At a position corresponding to the opening portion formed at the rear end of the housing, a coupling ring coupled to the first connector member may be installed, and a first connection line configured to connect with the outside may be coupled to the coupling ring.

An inner surface of the coupling ring may have a ring screw portion coupled to the second connector member screw portion formed on an outer surface of the first connector member, and a surface of the coupling ring may be plated with a material having better solderability than a material of the coupling ring.

Advantageous Effects

As described above, in a multi-sensor assembly according to the present disclosure, following effects can be obtained.

In the present disclosure, at least one second sensor is installed inside a first sensor so that at least two physical quantities can be simultaneously measured and transmitted to a controller, and the measured physical quantities are transmitted to the controller through a housing. Therefore, there is an effect that various physical quantities can be measured by one sensor and used.

In the present disclosure, in order to transmit the signals detected by the first and second sensors to an outside through a connector, a coupling ring is installed at an end part of a first connector member connected to the first sensor, and an electric wire is connected to the coupling ring through soldering, whereby the connector is connected to the first connector member, and the measured value of the first sensor is transmitted to the controller. Accordingly, there is an effect that the measured value of the first sensor can be more accurately transmitted to the controller.

In the present disclosure, the first connector member serves to transmit the measured value of the first sensor. Since an impedance in a state that the first connector member is installed inside the housing and an impedance at a rear end of an adjustment fixture at a rear end of the housing are different, the first connector member and a first connection wire are connected to each other in a state that the first connector member is installed and located inside the housing. Therefore, the signal can be accurately transmitted with no change of the impedance at the rear end of the first connector member.

MODE FOR INVENTION

Figure 1:
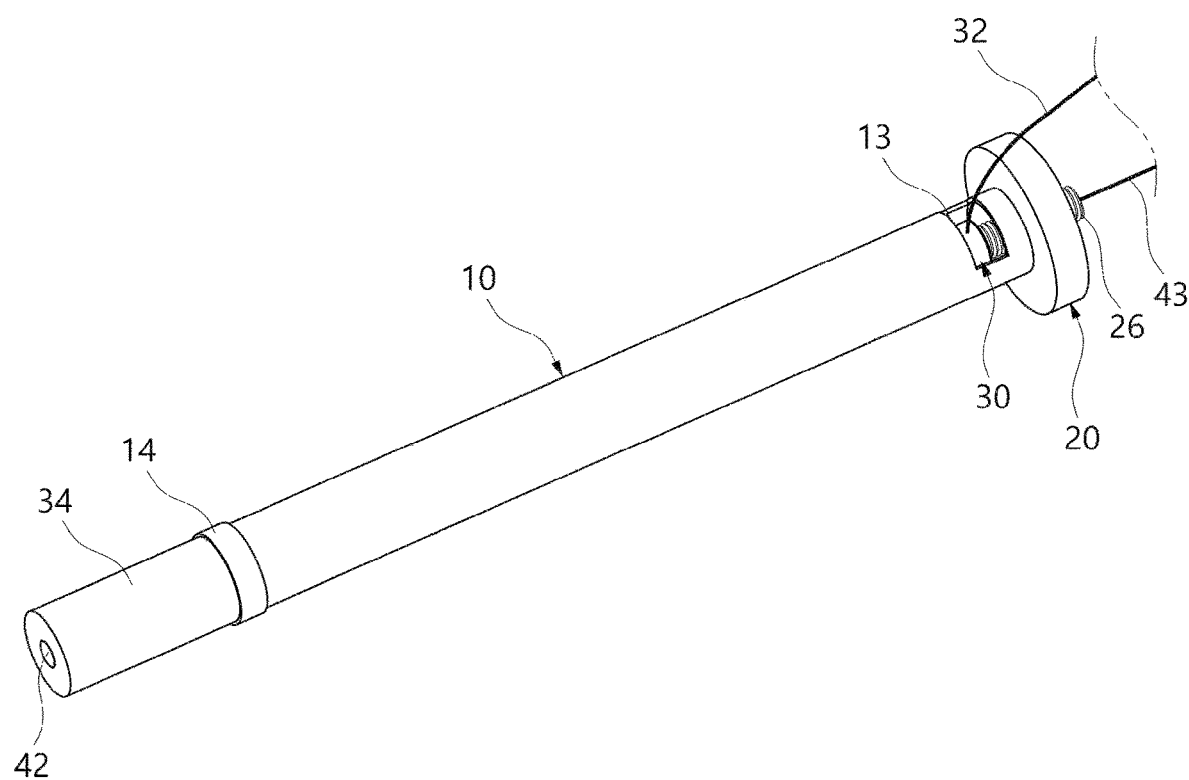
FIG. 1 is a perspective view showing a configuration of an exemplary embodiment of a multi-sensor assembly according to the present disclosure.
Figure 2:
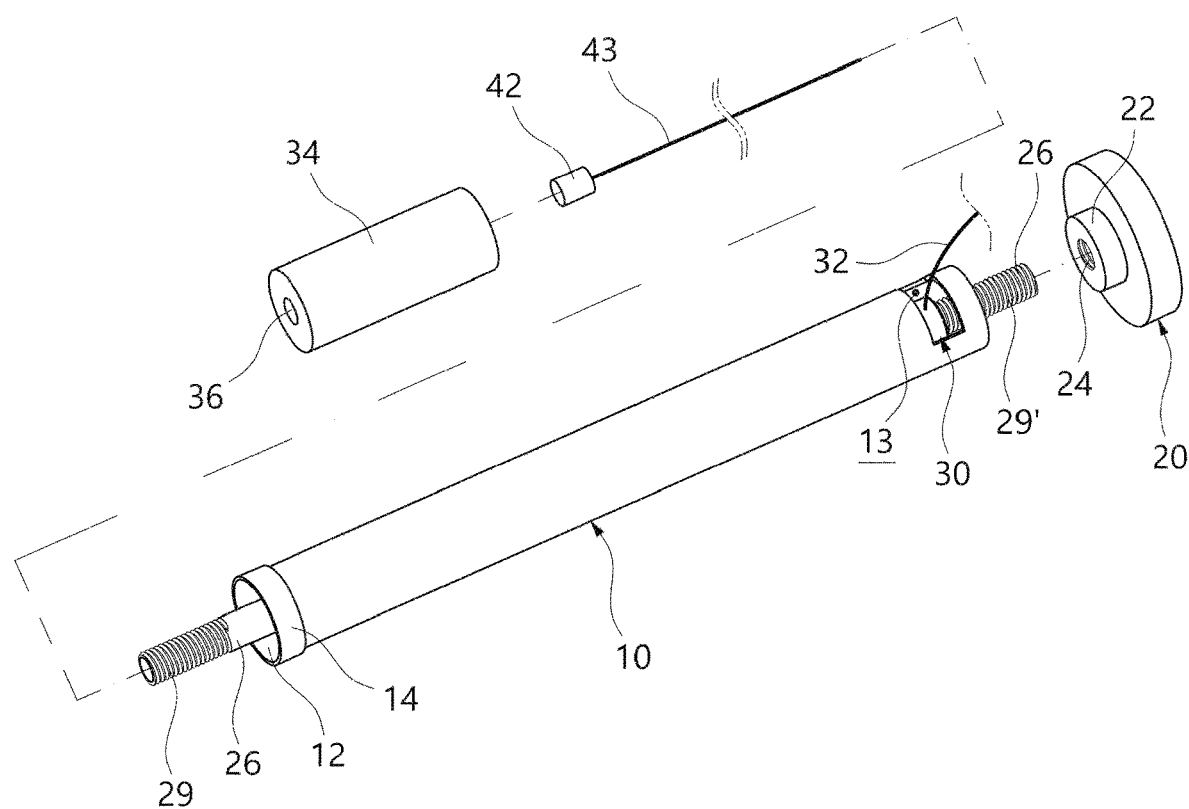
FIG. 2 is an exploded perspective view showing the configuration of the embodiment of the present disclosure.
Figure 3:
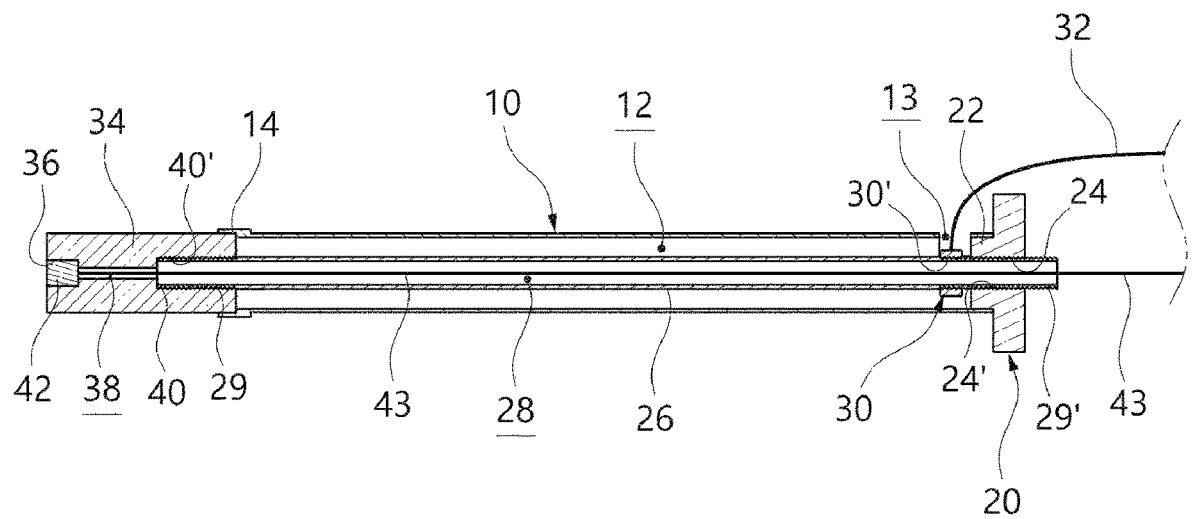
FIG. 3 is a cross sectional view showing an internal configuration of the embodiment of the present disclosure.
Figure 4:
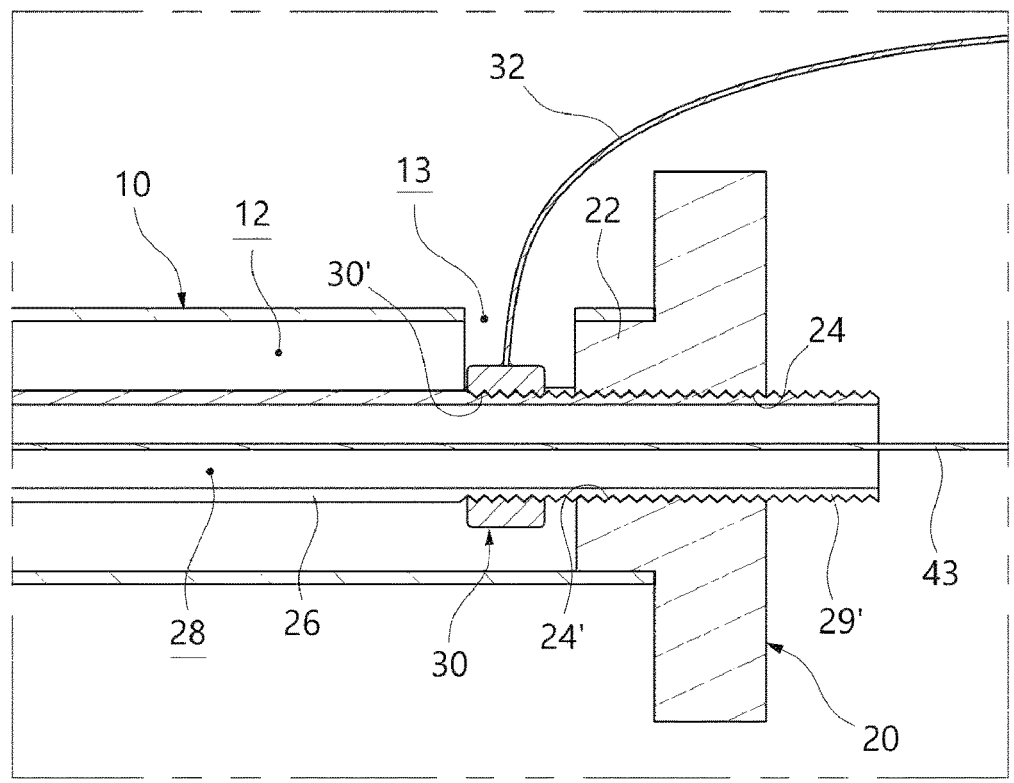
FIG. 4 is an enlarged sectional view showing an adjustment fixture and a periphery thereof in the embodiment of the present disclosure.
Figure 5:
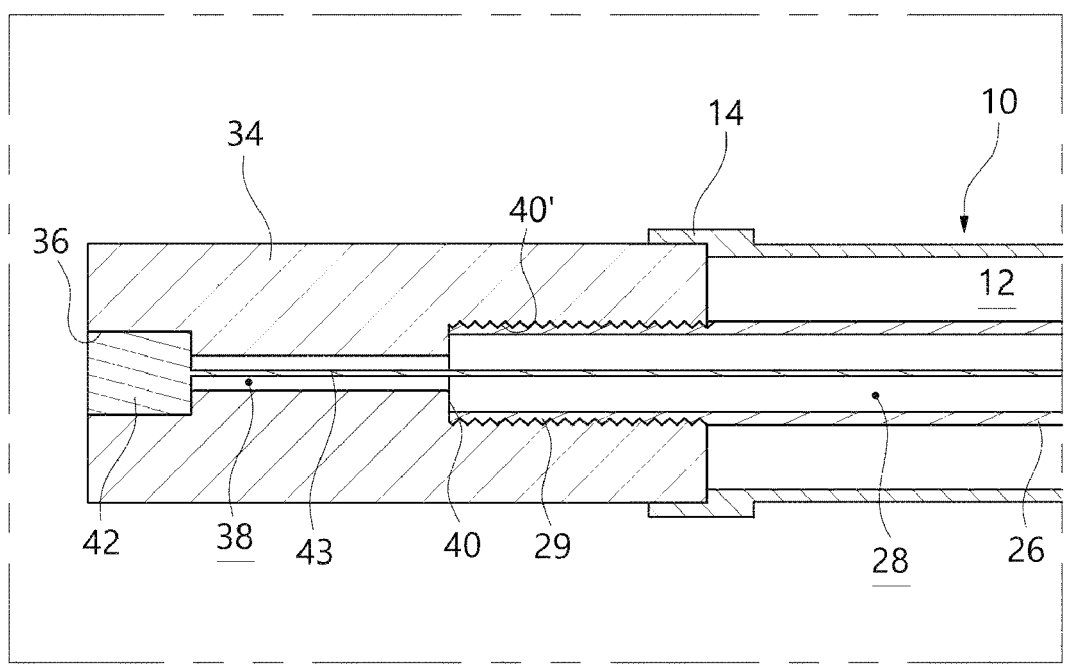
FIG. 5 is an enlarged sectional view showing a sensor holder and a periphery thereof in the embodiment of the present disclosure.

Hereinafter, some embodiments of the present disclosure will be described in detail with reference to exemplary drawings. In adding reference numerals to components of each drawing, it should be noted that the same components are given the same reference numerals as much as possible even though indicated on different drawings. In addition, in describing the embodiment of the present disclosure, when it is determined that a detailed description of a related known configuration or function interferes with the understanding of the embodiment of the present disclosure, the detailed description thereof will be omitted.

In addition, in describing the components of the embodiment of the present disclosure, terms such as first, second, A, B, (a), (b), and the like may be used. These terms are only for distinguishing the components from other components, and essence, an order, or a sequence of the components are not limited by the terms. When it is described that a component is "connected", "coupled" or "contacted" to another component, it will be understood that the component may be directly "connected", "coupled" or "contacted" to another component, but yet another component may also be "connected", "coupled" or "connected" between each of the components.

As shown in the drawings, a housing 10 forms an exterior of a multi-sensor assembly according to the present disclosure. The housing 10 has a predetermined internal space 12 formed therein. The housing 10 may be formed to have a length long, in consideration of a distance between the space, in which a first sensor 34 and a second sensor 42 of the multi-sensor assembly are placed to sense a physical quantity, and an outside. When the housing 10 is actually used, a part of one side is located in a space to be sensed and a part of an opposite side is located in a device with a controller or a device connectable with the controller. In this embodiment, the housing 10 has a pipe shape having a predetermined length.

An opening portion 13 is formed on an outer surface of one end part of the housing 10. The opening portion 13 is formed by removing about half of the outer surface of the housing 10, thereby allowing an inner space 12 and the outside to communicate with each other. A first connection line 32 to be described below may extend from the inner space 12 to the outside through the opening portion 13.

At an opposite end part of the housing 10, that is, at an end part of an opposite side to the one end part where the opening portion 13 is formed, there is a sensor coupling unit 14. The sensor coupling unit 14 is a part to which the first sensor 34 to be described below is coupled.

An adjustment fixture 20 is installed at the one end part of the housing 10, that is, at a side opposite to the sensor coupling unit 14. The adjustment fixture 20 may be made of an insulating material. The adjustment fixture 20 has a portion in a disk shape exposed to the outside of the housing 10. An insertion protrusion 22 protrudes from one surface of the adjustment fixture 20. The insertion protrusion 22 is a portion to be inserted into the inner space 12 of the housing 10. An outer diameter of the insertion protrusion 22 is almost the same as an inner diameter of the housing 10 so that the insertion protrusion 22 is inserted into the housing 10, thereby allowing the adjustment fixture 20 to be rotated by force no less than predetermined force.

A connection hole 24 is formed through a center of the adjustment fixture 20. The connection hole 24 is a portion through which a first connector member 26 to be described below passes through. A fixture screw portion 24' is formed on an inner surface of the connection hole 24. The fixture screw portion 24' is coupled with a second connector member screw portion 29' formed in the first connector member 26 to be described below. The fixture screw portion 24' and the second connector member screw portion 29' may make a linear movement of the first connector member 26 occur by a rotation of the adjustment fixture 20. The linear movement of the first connector member 26 provides a position of the first sensor 34 to be set and allows the first sensor 34 to be coupled to the sensor coupling unit 14 of the housing 10.

The first connector member 26 has a tubular shape made of a conductive metal material. The first connector member 26 serves to provide the installation position of the first sensor 34, which will be described below, to be set and at the same time, to transmit a signal measured by the first sensor 34. There is a communication path 28 passing through the inside of the first connector member 26. The communication path 28 is formed through the first connector member 26 in a longitudinal direction. A second connection line 43 to be described below passes through the communication path 28. The first connector member 26 may be made of aluminum in consideration of weight, electrical conductivity, or the like.

A first connector member screw portion 29 is formed on an outer surface of one end of the first connector member 26. The first connector member screw portion 29 is coupled to a coupling screw portion 40' of the first sensor 34 so that the first sensor 34 and the first connector member 26 are coupled to each other. A second connector member screw portion 29' is formed on the outer surface of an opposite end part of the first connector member 26. The second connector member screw portion 29' is coupled to the fixture screw portion 24' of the adjustment fixture 20.

A coupling ring 30 may also be coupled to the second connector member screw portion 29'. Of course, a screw portion may be formed separately from the second connector member screw portion 29' so that the coupling ring 30 may be coupled thereto, but the second connector member screw portion 29' may be formed up to a position where the coupling ring 30 is located and coupled to the coupling ring 30. A ring screw portion 30' is formed on an inner surface of the coupling ring 30 to be coupled to the second connector member screw portion 29'.

The coupling ring 30 is also made of a conductive material. An outer surface of the coupling ring 30 may be plated with a material having better solderability than the material of the coupling ring 30. When the coupling ring 30 is made of aluminum, the coupling ring may be plated with silver. A silver plated layer is formed on the outer surface of the coupling ring 30, and the first connection line 32 is fixedly soldered thereto. The first connection line 32 serves to transmit a sensing signal of the first sensor 34 transmitted through the first connector member 26. A connector is provided at an end part of an opposite side of the first connection line 32, thereby being allowed to be easily connected to the outside.

The first sensor 34 is coupled to a front end of the housing 10 in a state of being coupled to the first connector member 26. The first connector member 26 pulls the first sensor 34 backward by a relative movement with respect to the adjustment fixture 20, so the housing 10 and the first sensor 34 are fixedly installed. A mounting groove 36 is formed to be open toward a front surface of the first sensor 34, and a second sensor 42 to be described below is located in the mounting groove 36.

A through hole 38 is formed in the first sensor 34 by being communicated with the mounting groove 36, and a coupling hole 40 is formed to allow the through hole 38 and the outside to be communicated with each other. Accordingly, going from one side to an opposite side in the first sensor 34, the mounting groove 36, the through hole 38, and the coupling hole 40 are sequentially formed to pass through the first sensor 34. A coupling screw portion 40' is formed on an inner surface of the coupling hole 40. The coupling screw portion 40' is coupled to the first connector member screw portion 29 of the first connector member 26. The first sensor 34 has an overall cylindrical shape in the illustrated embodiment but may have various shapes.

A second sensor 42 is installed in the mounting groove 36. The second connection line 43 is connected to the second sensor 42. The second connection line 43 serves to transmit a signal sensed by the second sensor 42 to the outside. The second connection line 43 passes through the communication path 28 of the first connector member 26 located in the through hole 38 and the coupling hole 40 and extends to the one end part of the housing 10, thereby being connected to the outside.

Meanwhile, a plurality of mounting grooves 36 may be formed in the first sensor 34. That is, the mounting grooves 36 may be formed to be open toward the periphery of the mounting groove 36 in which the second sensor 42 is seated or to an outer surface of the first sensor 34, and sensors of types different from one another may be installed in such mounting grooves 36. In such a manner, various types of sensors may simultaneously sense various physical quantities. A through hole 38 communicates with these mounting grooves 36, or separate through holes are formed to be connected to the current through hole 38, and a connection line configured to transmit the value measured by the corresponding sensor may be allowed to be extendedly formed to the communication path 28.

Hereinafter, how to assemble and use the multi-sensor assembly according to the present disclosure having the configuration as described above will be described in detail.

First, it will be described how to assemble the multi-sensor assembly shown. The first sensor 34 is installed at the front end of the housing 10. Prior to this, the first sensor 34 is installed at the front end of the housing 10 in a state in which the first connector member 26 passing through the housing 10 is coupled. This is accomplished by coupling the coupling screw portion 40' formed in the coupling hole 40 of the first sensor 34 and the first connector member screw portion 29 formed in the first connector member 26 to each other. In a state in which the first sensor 34 and the first connector member 26 are coupled to each other, the second connection line 43 of the second sensor 42 is made come out to an opposite side of the first connector member 26 through the mounting groove 36 and the through hole 38 of the first sensor 34 and the communication path 28. The assembly of the first sensor 34, the second sensor 42, and the first connector member 26 made in this way is coupled to the housing 10.

That is, the first connector member 26 enters the inner space 12 of the housing 10, and the opposite end part of the first connector member 26 protrudes out of the housing 10. The coupling ring 30 is coupled to the first connector member 26 protruding to the outside of the housing 10, thereby being positioned to be exposed to the opening portion 13. The first connection line 32 may be soldered to the coupling ring 30 at this time. Of course, after coupling the adjustment fixture 20, the first connection line 32 may be soldered.

The adjustment fixture 20 is installed at a rear end part of the housing 10. The insertion protrusion 22 of the adjustment fixture 20 is inserted into the inner space 12 of the housing 10, and then the fixture screw portion 24' of the adjustment fixture 20 and the second connector member screw portion 29' of the first connector member 26 are coupled. At this time, when the adjustment fixture 20 is rotated with respect to the housing 10 around the insertion protrusion 22, the adjustment fixture 20 rotates only with respect to the housing 10 and does not move along the housing 10. Therefore, by the rotation of the adjustment fixture 20, the fixture screw portion 24' and the second connector member screw portion 29' move relatively to each other, so that the first connector member 26 moves with respect to the housing 10 and the adjustment fixture 20. That is, the first sensor 34 is coupled to the sensor coupling unit 14 being at the front end part of the housing 10.

For reference, an assembling sequence of the multi-sensor assembly of the present disclosure may be performed as follows even besides the above sequence. The coupling ring 30 is coupled to the first connector member 26 in a state in which the housing 10 and the remaining parts except for the adjustment fixture 20 are assembled, and in this state, the first connector member 26 is made to come out of the inner space 12 of the housing 10 passing therethrough. In addition, the fixture screw portion 24' of the adjustment fixture 20 and the second connector member screw portion 29' of the first connector member 26 are coupled and relatively moved to each other, whereby the first sensor 34 becomes to be coupled to the sensor coupling portion 14 being at the front end of the housing 10.

In the multi-sensor assembly according to the present disclosure made as described above, the first connection line 32 and the second connection line 43 are respectively connected to the controller to transmit the sensed signal. Here, the path for transmitting the measured value of the first sensor 34 includes the first connector member 26, which is at the inner space 12 of the housing 10, and the first connection line 32, which passes through the opening portion 13 of the housing 10 and is extended to the outside. In order to accurately transmit the measured value of the first sensor 34, an impedance value of the path through which the measured value of the first sensor 34 is transmitted needs to be set to be constant. To this end, the first connector member 26 is installed at the inner space 12 of the housing 10, whereby the impedance value is to be set constant.

However, due to the existence of the adjustment fixture 20 installed at the rear end of the housing 10, the impedance value of the first connector 26 at a position past the adjustment fixture 20 is different from that at a position where the first sensor 34 is positioned. Therefore, in order to accurately transmit the measured value of the first sensor 34 to the controller, the first connection line 32 is connected to the first connector member 26 through the opening portion 13 so that the impedance value is set to be constant.

In addition, a ring screw portion 30' of the coupling ring 30 is coupled to the second connector member screw portion 29' formed on an outer surface of the rear end of the first connector member 26. By doing this, a contact area between the coupling ring 30 and the first connector member 26 is maximized. In addition, by soldering the first connection line 32 to the plating layer formed on the surface of the coupling ring 30, the electrical connection is accurately well made.

In particular, the position where the first connection line 32 is connected to the first connector member 26 is closer to the first sensor 34 than the position where the adjustment fixture 20 is installed, whereby the adjustment fixture 20 is not allowed to affect the impedance. Therefore, the present disclosure does not need to adjust the impedance by the connection of a controller.

In the above, even though all the components constituting the embodiment of the present disclosure are described as being combined as one or operated in combination, the present disclosure is not necessarily limited to the present embodiment. That is, within the scope of the objective of the present disclosure, all the components may operate by selectively combining at least one. In addition, terms such as "comprise", "consist", "have", or the like described above mean that the corresponding component may be embedded unless specifically contrarily stated so should be construed as being able to include other components further rather than excluding other components. All terms including technical and scientific terms have the same meaning as commonly understood by one of ordinary skill in the art to which the present disclosure belongs, unless otherwise defined. Terms commonly used, such as those defined in the dictionary, should be interpreted as being consistent with the contextual meaning of the related art and should not be interpreted in an ideal or excessively formal meaning unless explicitly defined in the present disclosure.

The above description is merely illustrative of the technical spirit of the present disclosure, and various modifications and variations will be possible without departing from the essential characteristics of the present disclosure by those skilled in the art to which the present disclosure pertains. Accordingly, the embodiments disclosed in the present disclosure are not intended to limit the technical spirit of the present disclosure but to explain, and the scope of the technical spirit of the present disclosure is not limited by these embodiments. The protection scope of the present disclosure should be interpreted by the following claims, and all technical ideas within the scope equivalent thereto should be construed as being included in the scope of the present disclosure.

In the illustrated embodiment, the first sensor 34 is a partial discharge sensor that detects whether or not partial discharge is present, and the second sensor 42 is a hydrogen sensor that detects hydrogen, wherein combinations of these sensors may be made in various ways. In addition, although a plurality of second sensors 42 is provided, these second sensors 42 may each perform different functions.

In addition, in the illustrated embodiment, one second sensor 42 is installed in the first sensor 34, but as described above, a plurality of second sensors 42 may be installed in the first sensor 34.

The invention claimed is:

1. A multi-sensor assembly, the assembly comprising:
a housing having an internal space formed therein;
a first sensor coupled to a front end of the housing and configured to measure a physical quantity;
a first connector member made of a conductive metal material, configured to transmit the physical quantity measured by the first sensor, having a communication path passing through the inside of the first connector member, having the first sensor coupled to a front end thereof, and installed in an inner space of the housing;
at least one second sensor installed in the first sensor and having a second connection line extending to an outside of the housing through the communication path;
a first connection line electrically connected to a rear end of the first connector member and extending to the outside through an opening portion formed at a rear end of the housing; and
an adjustment fixture installed at the rear end of the housing and coupled to the first connector member to set an installation position of the first sensor by a rotation of the adjustment fixture.

2. The assembly of claim 1, wherein the housing extends long in a longitudinal direction in a tubular shape.

3. The assembly of claim 2, wherein the first sensor is formed with a mounting groove to be open toward a front surface, the mounting groove being installed with the second sensor therein.

4. The assembly of claim 3, wherein the first sensor is formed with a through hole to communicate with the mounting groove thereof, the first sensor is formed with a coupling hole to allow the through hole and the outside to communicate with each other, and the coupling hole is coupled to the first connector member so that the inside of the first connector member and the through hole are in communication with each other, whereby the second connection line configured to transmit a signal of the second sensor passes therethrough.

5. The assembly of claim 1, wherein, at a position corresponding to the opening portion formed at the rear end of the housing, a coupling ring coupled to the first connector member is installed, and a first connection line configured to connect with the outside is coupled to the coupling ring.

6. The assembly of claim 5, wherein an inner surface of the coupling ring has a ring screw portion coupled to a second connector member screw portion formed on an outer surface of the first connector member, and a surface of the coupling ring is plated with a material having better solderability than a material of the coupling ring.

7. The assembly of claim 2, wherein, at a position corresponding to the opening portion formed at the rear end of the housing, a coupling ring coupled to the first connector member is installed, and a first connection line configured to connect with the outside is coupled to the coupling ring.

8. The assembly of claim 7, wherein an inner surface of the coupling ring has a ring screw portion coupled to a second connector member screw portion formed on an outer surface of the first connector member, and a surface of the coupling ring is plated with a material having better solderability than a material of the coupling ring.

9. The assembly of claim 3, wherein, at a position corresponding to the opening portion formed at the rear end of the housing, a coupling ring coupled to the first connector member is installed, and a first connection line configured to connect with the outside is coupled to the coupling ring.

10. The assembly of claim 9, wherein an inner surface of the coupling ring has a ring screw portion coupled to a second connector member screw portion formed on an outer surface of the first connector member, and a surface of the coupling ring is plated with a material having better solderability than a material of the coupling ring.

11. The assembly of claim 4, wherein, at a position corresponding to the opening portion formed at the rear end of the housing, a coupling ring coupled to the first connector member is installed, and a first connection line configured to connect with the outside is coupled to the coupling ring.

12. The assembly of claim 11, wherein an inner surface of the coupling ring has a ring screw portion coupled to a second connector member screw portion formed on an outer surface of the first connector member, and a surface of the coupling ring is plated with a material having better solderability than a material of the coupling ring.

* * * * *